(12) United States Patent
Sahu et al.

(10) Patent No.: US 12,669,412 B2
(45) Date of Patent: Jun. 30, 2026

(54) METHOD AND SYSTEM FOR ACOUSTIC BASED INDUSTRIAL MACHINE INSPECTION USING DAS-BEAMFORMING AND DICTIONARY LEARNING

(71) Applicant: Tata Consultancy Services Limited, Mumbai (IN)

(72) Inventors: Saurabh Sahu, Bangalore (IN); Achanna Anil Kumar, Bangalore (IN); Mariswamy Girish Chandra, Bangalore (IN); Kriti Kumar, Bangalore (IN); Angshul Majumdar, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 424 days.

(21) Appl. No.: 18/400,174

(22) Filed: Dec. 29, 2023

(65) Prior Publication Data

US 2024/0288340 A1     Aug. 29, 2024

(30) Foreign Application Priority Data

Feb. 28, 2023     (IN) ............................ 202321013504

(51) Int. Cl.
*G01M 99/00*     (2011.01)
*H04R 3/00*     (2006.01)
(Continued)
(52) U.S. Cl.
CPC .......... *G01M 99/005* (2013.01); *H04R 3/005* (2013.01); *H04R 5/027* (2013.01); *H04S 3/008* (2013.01);
(Continued)

(58) Field of Classification Search
CPC ......... H04R 3/005; H04R 5/027; H04S 3/008; H04S 2400/01; H04S 2400/15; G01M 99/005
See application file for complete search history.

(56) References Cited

U.S. PATENT DOCUMENTS 11,443,757 B2     9/2022   Choi
11,848,027 B2 *  12/2023   Krishnan ................ G10L 25/87
(Continued)

FOREIGN PATENT DOCUMENTS

CN          113589265 A     11/2021

OTHER PUBLICATIONS

Chen et al., "Multiple Sound Source Localization, Separation, and Reconstruction by Microphone Array: A DNN-Based Approach," Appl. Sci., (2022).

*Primary Examiner* — Paul W Huber
(74) *Attorney, Agent, or Firm* — Finnegan, Henderson, Farabow, Garrett & Dunner, LLP

(57)          ABSTRACT

This disclosure relates generally to a field of industrial machine inspection, and, more particularly, to method and system for acoustic based industrial machine inspection using Delay-and-Sum beamforming (DAS-BF) and dictionary learning (DL). The disclosed method presents a two-stage approach for anomaly detection using a multi-channel acoustic mixed signal. In the first stage, separation of a plurality of acoustic signals corresponding to the spatially distributed acoustic sources is performed at a coarser level by using the DAS-BF. Subsequently, dictionaries pre-trained using the plurality of acoustic signals of the individual source machines are utilized for generating a plurality of separated acoustic source signals. The generated plurality of separated acoustic source signals are analyzed for the
(Continued)

anomaly detection by comparing them with a corresponding normal machine sound template.

20 Claims, 5 Drawing Sheets

(51) Int. Cl.
  *H04R 5/027*          (2006.01)
  *H04S 3/00*           (2006.01)
(52) U.S. Cl.
  CPC ....... *H04S 2400/01* (2013.01); *H04S 2400/15* (2013.01)

(56)                  References Cited

U.S. PATENT DOCUMENTS

| | | | |
|---|---|---|---|
| 2021/0256991 A1* | 8/2021 | Jun .......................... | G10L 25/18 |
| 2023/0206942 A1* | 6/2023 | Schneider ........... | G01M 17/007 704/200 |

* cited by examiner

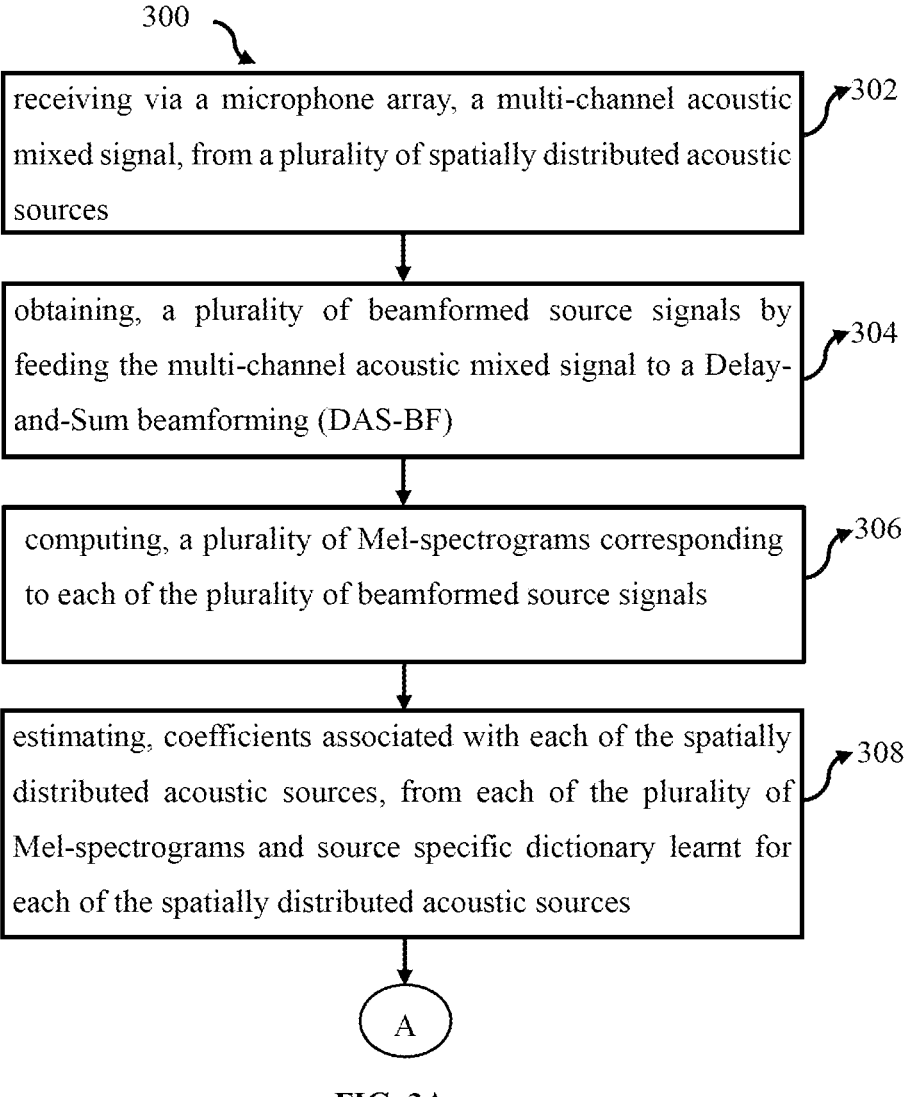

300 receiving via a microphone array, a multi-channel acoustic mixed signal, from a plurality of spatially distributed acoustic sources    302 obtaining, a plurality of beamformed source signals by feeding the multi-channel acoustic mixed signal to a Delay-and-Sum beamforming (DAS-BF)    304 computing, a plurality of Mel-spectrograms corresponding to each of the plurality of beamformed source signals    306 estimating, coefficients associated with each of the spatially distributed acoustic sources, from each of the plurality of Mel-spectrograms and source specific dictionary learnt for each of the spatially distributed acoustic sources    308

A estimating, a plurality of separated acoustic source signals associated with the spatially distributed acoustic sources, using the learnt source specific dictionary and the coefficients associated with each of the spatially distributed acoustic sources

310 analyzing, the plurality of separated acoustic source signals with the corresponding normal machine sound template for each of the spatially distributed acoustic sources, using a threshold value, wherein a deviation beyond the threshold value is indicated as an anomaly, and wherein the threshold values corresponding to each of the plurality of spatially distributed acoustic sources are empirically calculated

METHOD AND SYSTEM FOR ACOUSTIC BASED INDUSTRIAL MACHINE INSPECTION USING DAS-BEAMFORMING AND DICTIONARY LEARNING

PRIORITY CLAIM

This U.S. patent application claims priority under 35 U.S.C. § 119 to: Indian provisional patent Application No. 20/232,1013504, filed on Feb. 28, 2023. The entire contents of the aforementioned application are incorporated herein by reference.

TECHNICAL FIELD

The disclosure herein generally relates to the field of industrial machine inspection, and, more particularly, to method and system for acoustic based industrial machine inspection using Delay-and-Sum beamforming (DAS-BF) and dictionary learning (DL).

BACKGROUND

In industrial inspection scenarios, early detection of machine faults is extremely important to prevent significant damage resulting in economic losses. Acoustic signals provide primary indications of machine health, studying the acoustic signals is imperative for detection of the machine faults. Another advantage is that the acoustic signals can be acquired unobtrusively using microphones. However, the acoustic signals captured in an industrial plant is mostly corrupted by interference and background noise due to multiple machines operating simultaneously.

SUMMARY

Embodiments of the present disclosure present technological improvements as solutions to one or more of the above-mentioned technical problems recognized by the inventors in conventional systems. For example, in one embodiment, a method for acoustic based industrial machine inspection using Delay-and-Sum beamforming (DAS-BF) and dictionary learning (DL) is provided. The method comprising: receiving, via a microphone array, a multi-channel acoustic mixed signal, from a plurality of spatially distributed acoustic sources, wherein the multi-channel acoustic mixed signal comprises a plurality of acoustic source signals interfered with each other, received from the plurality of spatially distributed acoustic sources; obtaining, a plurality of beamformed source signals, by feeding the multi-channel acoustic mixed signal to a DAS-BF; computing, a plurality of Mel-spectrograms corresponding to each of the plurality of beamformed source signals; estimating, coefficients associated with each of the plurality of spatially distributed acoustic sources, from each of the plurality of Mel-spectrograms and a source specific dictionary is learnt for each of the plurality of spatially distributed acoustic sources; estimating, a plurality of separated acoustic source signals associated with the plurality of spatially distributed acoustic sources, using the learnt source specific dictionary and the coefficients associated with each of the plurality of spatially distributed acoustic sources; and analyzing, the plurality of separated acoustic source signals with a normal machine sound template corresponding to each of the plurality of spatially distributed acoustic sources, using a threshold value, wherein a deviation beyond the threshold value is indicated as an anomaly.

In another aspect, a system for acoustic based industrial machine inspection using Delay-and-Sum beamforming (DAS-BF) and dictionary learning (DL) is provided. The system comprising: a memory storing instructions; one or more communication interfaces; and one or more hardware processors coupled to the memory via the one or more communication interfaces, wherein the one or more hardware processors are configured by the instructions to: receive via a microphone array, a multi-channel acoustic mixed signal, from a plurality of spatially distributed acoustic sources, where in the multi-channel acoustic mixed signal comprises a plurality of acoustic source signals interfered with each other, received from the plurality of spatially distributed acoustic sources; obtain a plurality of beamformed source signals, by feeding the multi-channel acoustic mixed signal to a DAS-BF; compute a plurality of Mel-spectrograms corresponding to each of the plurality of beamformed source signals; estimate coefficients associated with each of the plurality of spatially distributed acoustic sources, from each of the plurality of Mel-spectrograms and a source specific dictionary is learnt for each of the plurality of spatially distributed acoustic sources; estimate a plurality of separated acoustic source signals associated with the plurality of spatially distributed acoustic sources, using the learnt source specific dictionary and the coefficients associated with each of the plurality of spatially distributed acoustic sources; and analyze the plurality of separated acoustic source signals with a normal machine sound template corresponding to each of the plurality of spatially distributed acoustic sources, using a threshold value, wherein a deviation beyond the threshold value is indicated as an anomaly.

In yet another aspect, there are provided one or more non-transitory machine-readable information storage mediums comprising one or more instructions which when executed by one or more hardware processors cause a method for acoustic based industrial machine inspection using Delay-and-Sum beamforming (DAS-BF) and dictionary learning (DL) is provided. The method comprising: receiving, via a microphone array, a multi-channel acoustic mixed signal, from a plurality of spatially distributed acoustic sources, wherein the multi-channel acoustic mixed signal comprises a plurality of acoustic source signals interfered with each other, received from the plurality of spatially distributed acoustic sources; obtaining, a plurality of beamformed source signals, by feeding the multi-channel acoustic mixed signal to a DAS-BF; computing, a plurality of Mel-spectrograms corresponding to each of the plurality of beamformed source signals; estimating, coefficients associated with each of the plurality of spatially distributed acoustic sources, from each of the plurality of Mel-spectrograms and a source specific dictionary is learnt for each of the plurality of spatially distributed acoustic sources; estimating, a plurality of separated acoustic source signals associated with the plurality of spatially distributed acoustic sources, using the learnt source specific dictionary and the coefficients associated with each of the plurality of spatially distributed acoustic sources; and analyzing, the plurality of separated acoustic source signals with a normal machine sound template corresponding to each of the plurality of spatially distributed acoustic sources, using a threshold value, wherein a deviation beyond the threshold value is indicated as an anomaly.

In accordance with an embodiment of the present disclosure, the source specific dictionary corresponding to each of the plurality of spatially distributed acoustic sources is learnt by: receiving, via the corresponding microphone array controlled by the one or more hardware processors, a plurality of multi-channel acoustic source signals, from each of the plurality of spatially distributed acoustic sources; estimating, by the one or more hardware processors, a plurality of beamformed signals, by feeding each of the plurality of multi-channel acoustic source signals to the DAS-BF individually; computing, by the one or more hardware processors, the plurality of Mel-spectrograms corresponding to each of the plurality of beamformed signals; generating, by the one or more hardware processors, a plurality of learned dictionaries for each of the plurality of Mel-spectrograms corresponding to the plurality of the beamformed source signals, by using a dictionary learning formulation, wherein the dictionary learning formulation comprises the source specific dictionary and the coefficients, for each of the plurality of spatially distributed acoustic sources; enforcing, by the one or more hardware processors, an $l_1$-norm sparsity on the coefficients, for each of the dictionary learning formulation associated with the each of the plurality of spatially distributed acoustic sources; and obtaining, by the one or more hardware processors, the source specific dictionary and the coefficients associated with each of the plurality of spatially distributed acoustic sources, by iteratively solving the dictionary learning formulation using an Alternating Minimization (AM) approach.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 3A and 3B are flow diagrams illustrating a method for the acoustic based industrial machine inspection using DAS-BF and DL, using the system of FIG. 1, in accordance with some embodiments of the present disclosure.

DETAILED DESCRIPTION

Figure 1:
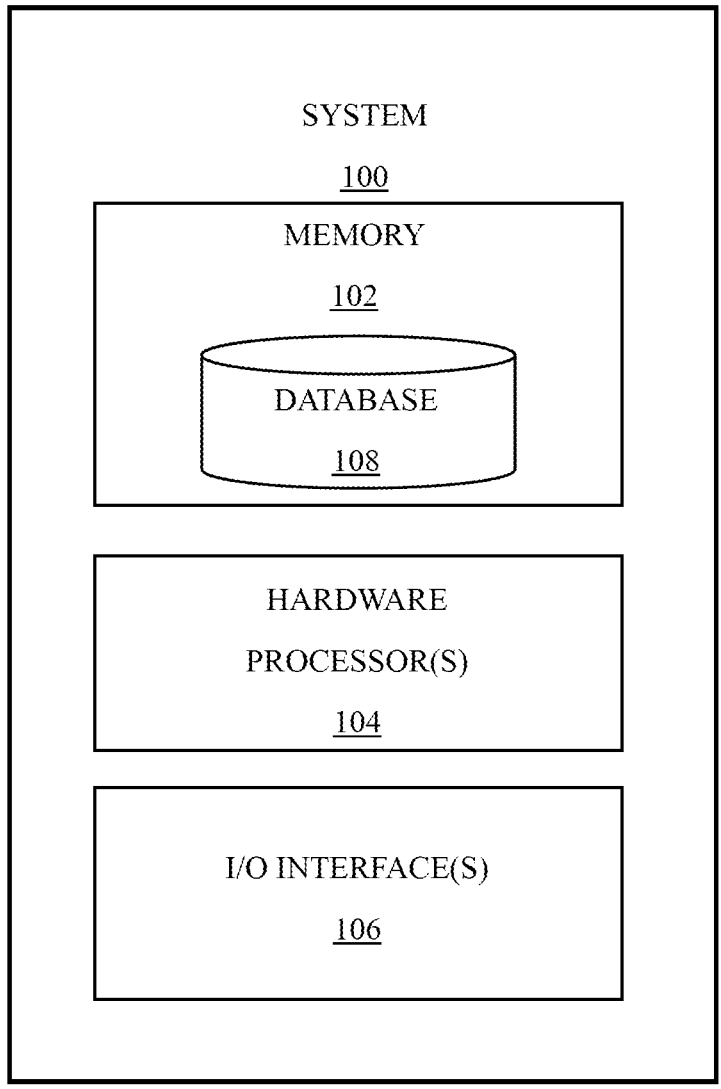
FIG. 1 illustrates an exemplary system for acoustic based industrial machine inspection using Delay-and-Sum beamforming (DAS-BF) and dictionary learning (DL), in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Acoustic signals originating from a machine are considered as one of the most important and early indicators of machine health. However, the acoustic signals acquired in an industrial setting is highly corrupted by interferences and background noise. Hence, there is a need to reduce this interference and the background noise so that the acoustic signals can be separated for improved anomaly detection. In practical application scenarios, information about the acoustic signals of all possible anomalous machine sounds is rarely available during training time.

In literature, an Autoencoder (AE) based architecture is used, where model is trained with the acoustic signals corresponding to normal machine sounds and anomaly scores are computed based on reconstruction error. These works make use of the publicly available Malfunctioning Industrial Machine Investigation and Inspection (MIMII) data where the acoustic signal corresponding to a single machine is present at a time, and that is analyzed for the anomaly detection. However, they do not handle composite mixtures of the acoustic signals where multiple sources are operating simultaneously, which is a usual case in real-world application scenarios. To handle the composite mixtures of the acoustic signals in literature (e.g., "H. Wu, J. He, M. T"om"osk"ozi, and F. H. Fitzek, "Abstraction-based multi-object acoustic anomaly detection for low-complexity big data analysis," in 2021 IEEE International Conference on Communications Workshops (ICC Workshops), 2021, pp. 1-6.") a neural network based multi-object acoustic anomaly detection approach called as Information-Abstraction-Net (IA-Net) is used. It utilized mixtures synthesized using MIMII data. However, this work considered a single channel mixture that limits the scalability to a complicated multi-source scenario.

Beamforming is a well-known multi-channel source separation technique for spatially distributed acoustic sources. For wideband signals, like the acoustic signals, source separation with the beamforming alone is not efficient as beamwidth depends on frequency and it is not uniform across the entire wideband. At low frequencies beam will be wide and at high frequencies grating lobes will appear as it may violate Nyquist inter-element separation criterion allowing signals from non-desired directions. Hence, in the datasets like MIMII, a good performance using the beamforming is expected only in a mid-frequency region.

Apart from the beamforming, other multi-channel Signal Processing (SP) based Blind Source Separation (BSS) techniques such as, Independent Component Analysis (ICA), Nonnegative Matrix Factorization also exist in literature. Deep learning-based techniques have also been explored in literature for supervised BSS due to their ability to model complex functions. However, they are computationally intensive and require massive amount of labeled data for training that may not be feasible in the practical application scenarios.

Embodiments herein provide a method and system for acoustic based industrial machine inspection using Delay-and-Sum beamforming (DAS-BF) and dictionary learning (DL). The method considers a multi-channel mixture synthesized by combining the acoustic signals from different machine sound sources to mimic a real factory setting. The present disclosure utilizes the DAS-BF and the DL based approach for the multi-channel source separation to separate the acoustic signals corresponding to the different machine sound sources that are further analyzed to detect anomalies.

The present disclosure is a two-stage approach for machine anomaly detection. In first stage, separation of the acoustic signals corresponding to the machine sound sources is performed at a coarser level by using the well-known computationally lightweight DAS-BF. Subsequently, dictionaries pre-trained using the acoustic signals of the individual machine sound sources are utilized for more refined source separation. The DL provides a data-driven paradigm for learning compact sparse representation of the acoustic signals and has been used successfully for signal processing, image processing and computational imaging. Hence, the DL is used in the present disclosure to learn representation of the acoustic signal for a source separation task. Further the separated sources are analyzed in second stage to detect anomalies by studying the deviation of the separated sources from a corresponding normal machine sound template. Experimental results obtained with the MIMII dataset demonstrate the potential of the disclosed method compared to other state-of-the-art methods for the machine anomaly detection.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 illustrates an exemplary system 100 for acoustic based industrial machine inspection using the DAS-BF and the DL, in accordance with some embodiments of present disclosure. In an embodiment, the system 100 may also be referred as acoustic system. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors.

Referring to the components of the system 100, in an embodiment, the processor (s) 104 can be the one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information on a multi-channel acoustic mixed signal, a plurality of spatially distributed acoustic sources, a plurality of beamformed source signals, a plurality of Mel-spectrograms, a plurality of separated acoustic source signals, the normal machine sound template, and a threshold value. The memory 102 further comprises a plurality of modules (not shown for various technique(s) such as the DAS BF, DL and the like. The memory 102 further comprises modules (not shown) implementing techniques such as Alternating Minimization (AM) approach, Iterative Soft Thresholding Algorithm (ISTA), Matching Pursuit (MP), Orthogonal Matching Pursuit (OMP), Basis Pursuit (BP), Mean-Square-Error (MSE) and, Signal-to-Noise Ratio (SNR). The above-mentioned technique(s) are implemented as at least one of a logically self-contained part of a software program, a self-contained hardware component, and/or, a self-contained hardware component with a logically self-contained part of a software program embedded into each of the hardware component (e.g., hardware processor 104 or memory 102) that when executed perform the method described herein. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
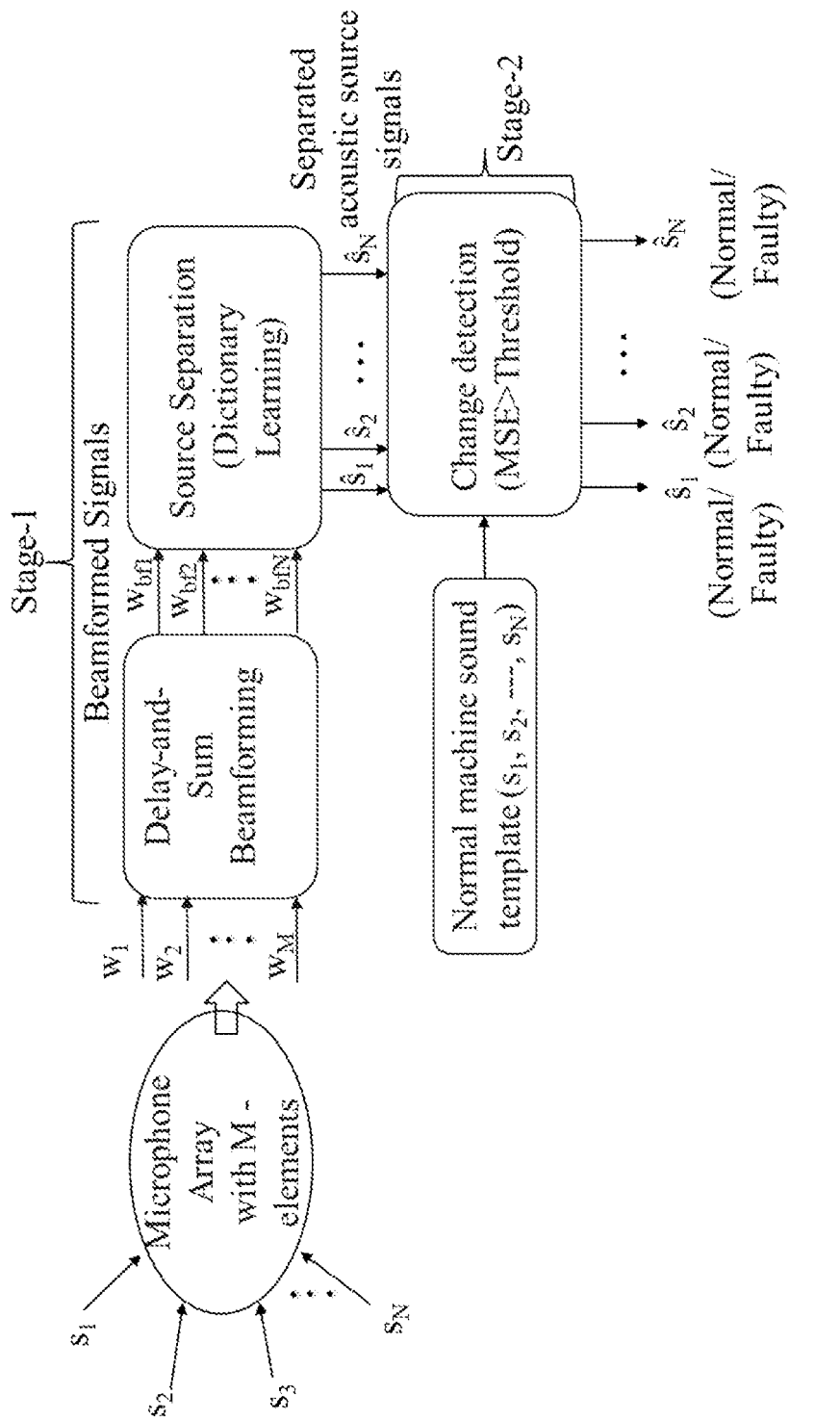
FIG. 2 depicts an architecture diagram of the acoustic based industrial machine inspection using DAS-BF and DL, using the system of FIG. 1, according to some embodiments of the present disclosure.

FIG. 2 depicts overview of the architecture of the system for the acoustic based industrial machine inspection using the DAS-BF and the DL, according to some embodiments of the present disclosure. The system 100 in FIG. 2 presents a two-stage framework that combines the DAS-BF and the DL for carrying out multichannel source separation followed by machine anomaly detection. In the first stage, the DAS-BF is employed to estimate individual acoustic sources at the coarser level. Subsequently, source specific dictionaries are learned that are used to obtain clean sources from a composite mixture signal. With the robust source estimation in place, a simple template matching approach is employed in the second stage to detect the anomalies effectively.

The system 100 in FIG. 2 includes components such as, microphone array with M-elements is configured to receive the multi-channel acoustic mixed signal from the plurality of spatially distributed acoustic sources, a Delay-and-Sum Beamforming is configured to generate the plurality of beamformed source signals from the multi-channel acoustic mixed signal, source separation block configured to identify the plurality of separated acoustic source signals associated with the spatially distributed acoustic sources using the plurality of learned dictionaries and coefficients associated with each of the spatially distributed acoustic sources, a change detection block is configured to analyze the plurality of separated acoustic source signals with the corresponding normal machine sound template that classifies each of the spatially distributed acoustic sources as one of faulty and normal based on the threshold value.

Figure 3B:
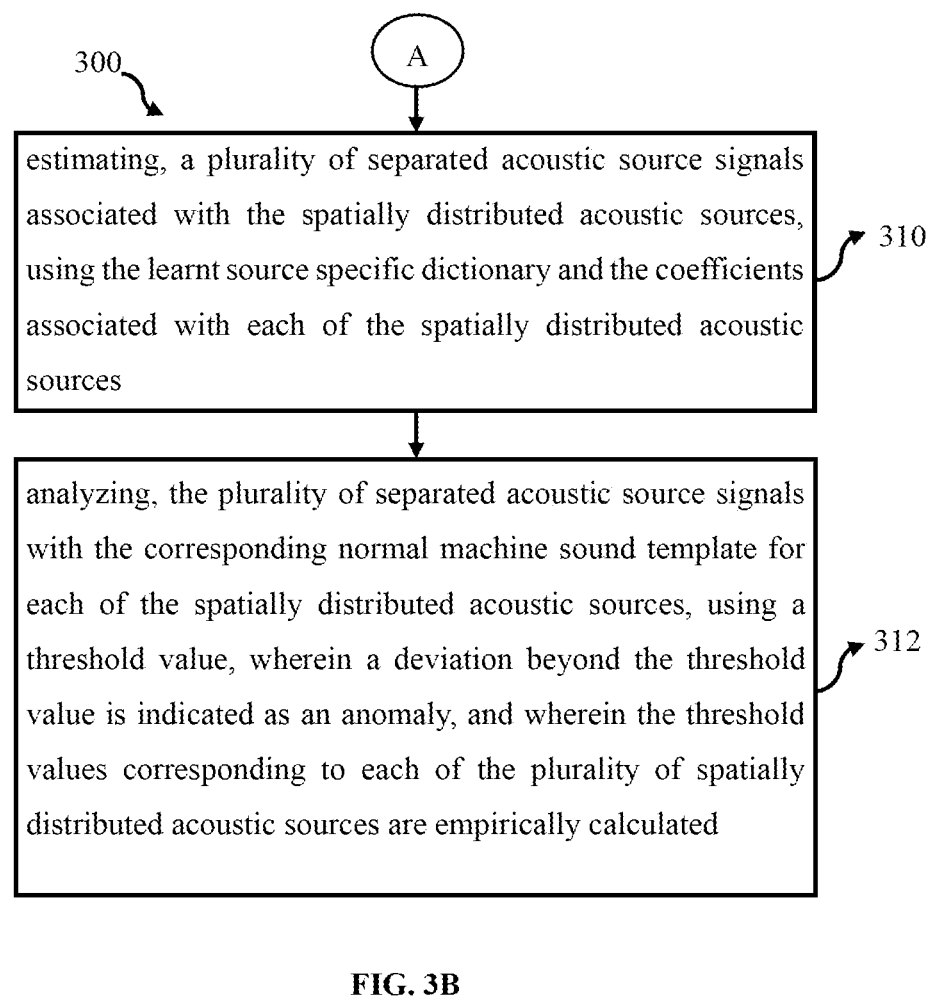

FIGS. 3A and 3B with reference to FIG. 1 are flow diagrams illustrating a method 300 for the acoustic based industrial machine inspection using DAS-BF and DL using the system of FIG. 1, in accordance with some embodiments of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1 and FIG. 2 and the flow diagram illustrated in FIGS. 3A and 3B. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to steps of FIG. 3A, at step 302 of the method 300, via the microphone array controlled by the one or more hardware processors 104 receive, the multi-channel acoustic mixed signal, from the plurality of spatially distributed acoustic sources. The plurality of spatially distributed acoustic sources include solenoid valves, water pumps, industrial fans, slide rails and thereof. The microphone array is comprising of M elements. A plurality of acoustic signals from the corresponding plurality of spatially distributed acoustic sources combinedly forms the multi-channel acoustic mixed signal. The multi-channel acoustic mixed signal received from the plurality of spatially distributed acoustic sources comprises a plurality of acoustic source signals that are interfered with each other. Let $s_1, \ldots, s_N$ represent the plurality of spatially distributed acoustic sources that are simultaneously present in the multi-channel acoustic mixed signal and are captured by the microphone array, as shown in the testing phase block of FIG. 4, in accordance with some embodiments of the present disclosure. The plurality of spatially distributed acoustic sources corresponds to machine sounds in the industrial setting. The acoustic signal $w_m$ of the multi-channel acoustic mixed signal received at $m^{th}$ array of the microphone array is expressed as:

$$w_m(t) = \sum_{n=1}^{N} a_{mn} s_n(t - \tau_{mn}) + n_m(t) \qquad (1)$$

where $a_{mn}$ is an attenuation coefficient; $\tau_{mn}$ denotes an arrival lag of the spatially distributed acoustic source n, at the microphone m of the microphone array with respect to a common reference microphone of the microphone array; $n_m(t)$ is an additive zero mean Gaussian noise at time t; $1 \leq m \leq M$; and N represents the plurality of spatially distributed acoustic sources.

The plurality of spatially distributed acoustic sources and their spatial directions are known, in accordance with some embodiments of the present disclosure. Hence the arrival lags corresponding to the plurality of spatially distributed acoustic sources are known. The arrival lags corresponding to the plurality of spatially distributed acoustic sources are estimated by using one of Estimation of signal parameters via rotational invariance technique (ESPRIT), multiple signal classification (MUSIC) algorithm and root-MUSIC algorithm. The disclosed method objective is to detect the anomalous spatially distributed acoustic sources, if any, from the plurality of spatially distributed acoustic sources, $s_1(t), s_2(t), \ldots, s_N(t)$, using the given M microphone signals $w_1(t), w_2(t), \ldots w_M(t)$ corresponding to the microphone array, assuming M>N. The two-stage approach used in the disclosed method consisting of separation of the plurality of spatially distributed acoustic sources followed by the change detection to identify anomaly associated with the corresponding plurality of spatially distributed acoustic sources.

At step 304 of the method 300, the one or more hardware processors obtain, a plurality of beamformed source signals, by feeding the multi-channel acoustic mixed signal to the DAS-BF. The multi-channel acoustic mixed signal received by each of the microphone in the microphone array corresponds to different known arrival lags depending on corresponding spatial locations of the plurality of spatially distributed acoustic sources. The multi-channel acoustic mixed signal is represented as $w_1, w_2, \ldots w_M$ that is fed to the DAS-BF, generating plurality of beamformed source signals that are represented as $w_{bf1}, \ldots, w_{bfN}$ as shown in the testing phase block of FIG. 4, in accordance with some embodiments of the present disclosure. The DAS-BF adds a time-shifted delayed signals of the multi-channel acoustic mixed signal received by the microphone array, based on direction of the plurality of spatially distributed acoustic sources, generating the plurality of beamformed source signals. For $s_n$ for n=1, . . . , N, the DAS-BF adds the time-shifted delayed signals as:

$$w_{bf_n}(t) = \sum_{m=1}^{M} w_m(t - \tau_{mn}) \qquad (2)$$

Addition of the time-shifted delayed signals results in a constructive superposition of the acoustic signal only in the direction of desired source of the plurality of spatially distributed acoustic sources, thereby enhancing the desired source s of the plurality of spatially distributed acoustic sources. This enables separation of the multi-channel acoustic mixed signal at the coarser level.

At step 306 of the method 300, the one or more hardware processors compute, the plurality of Mel-spectrograms $w_{bf1}, \ldots, w_{bfN}$ corresponding to each of the plurality of beamformed source signals $w_{bf1}, \ldots, w_{bfN}$.

Upon obtaining a plurality of Mel-spectrograms corresponding to each of the plurality of beamformed source signals, at step 308 of the method 300, the one or more hardware processors 104 estimate, coefficients $$\hat{z}_1^{test}, \ldots, \hat{z}_n^{test}$$

associated with each of the spatially distributed acoustic sources, from each of the plurality of Mel-spectrograms and a source specific dictionary learnt for each of the spatially distributed acoustic sources. The source specific dictionary corresponding to each of the spatially distributed acoustic source and the associated coefficients are estimated in a training phase as shown in the training phase block of FIG. 4, in accordance with some embodiments of the present disclosure.

The method 300 receives via the corresponding microphone array, a plurality of multi-channel acoustic source signals, from each of the plurality of spatially distributed acoustic sources. During the training phase, in accordance with some embodiments of the present disclosure, the microphone array receives the multi-channel acoustic signal when only one of the plurality of spatially distributed acoustic sources is operational, and the remaining spatially distributed acoustic sources are not operational to learn the source-specific dictionaries. This process is considered for all N sources.

Figure 4:
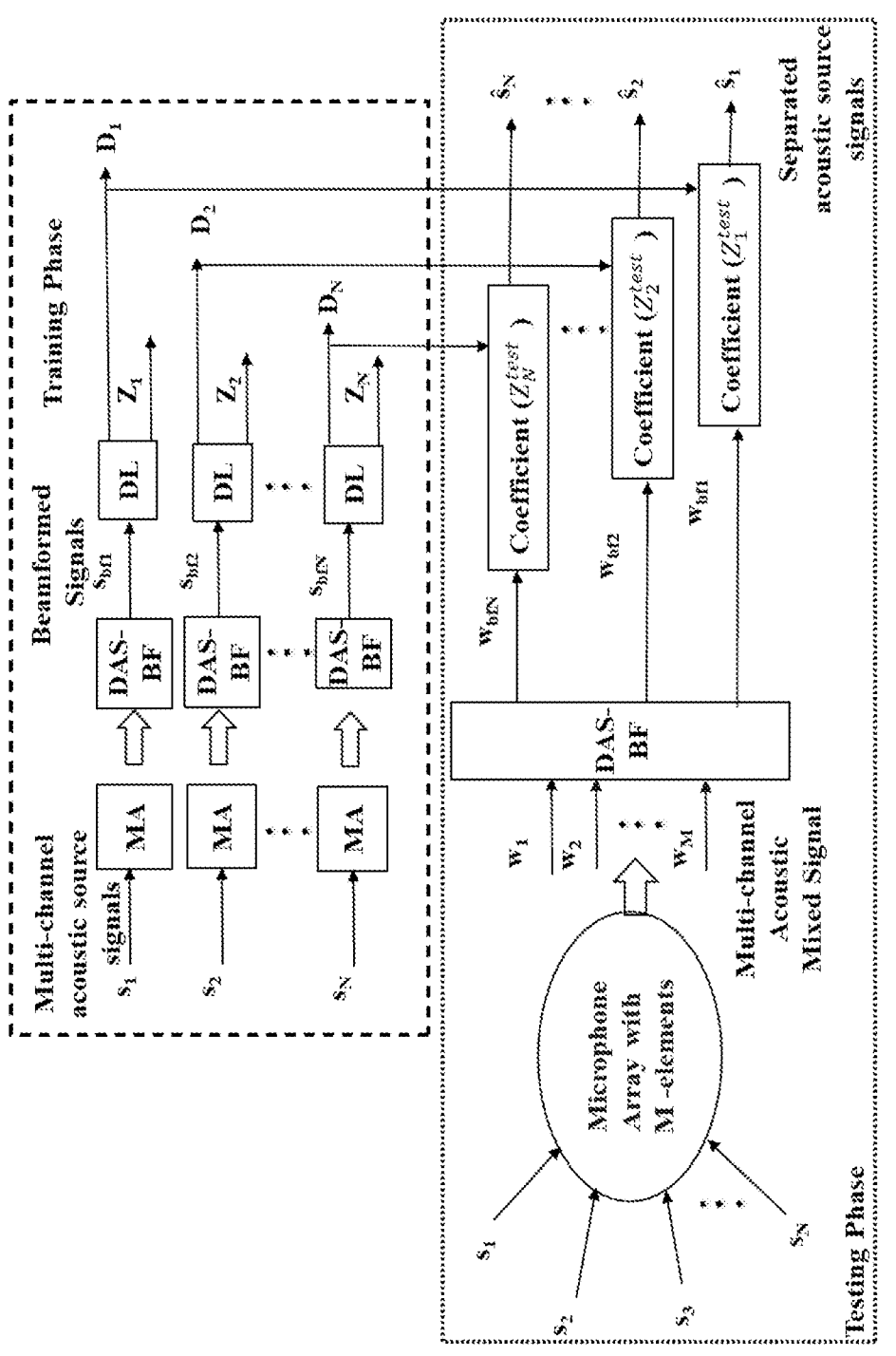
FIG. 4, depicts a training phase and a testing phase for the acoustic based industrial machine inspection using DAS-BF and DL, in accordance with some embodiments of the present disclosure.

A plurality of beamformed signals $s_{bf1}, \ldots, s_{bfN}$ are estimated by feeding the multi-channel acoustic source signal of each of the plurality of spatially distributed acoustic sources to the DAS-BF individually as shown in the training phase block of FIG. 4, in accordance with some embodiments of the present disclosure. The plurality of Mel-spectrograms $S_{bf1}, S_{bf2} \ldots S_{bfn}$ corresponding to each of the plurality of beamformed signals are computed. Then a plurality of learned dictionaries for each of the plurality of Mel-spectrograms corresponding to the plurality of the beamformed signals are generated by using a dictionary learning formulation. The dictionary learning formulation comprises the source specific dictionary of the plurality of learned dictionaries and the coefficients, for each of the spatially distributed acoustic sources. An $l_1$-norm sparsity on the coefficients is enforced, for each of the dictionary learning formulation associated with each of the spatially distributed acoustic sources. The source specific dictionary and the coefficients associated with each of the spatially distributed acoustic sources are obtained, by iteratively solving the dictionary learning formulation using Alternating Minimization (AM) approach.

The plurality of spatially distributed acoustic sources for n=1, . . . , N, the source specific dictionary $D_n$ for each of the plurality of spatially distributed acoustic sources is learnt using the dictionary learning formulation is given as:

$$S_{bf_n} = D_n Z_n \qquad (3)$$

where $D_n \in R^{T \times K}$ denotes the source specific dictionary learnt for the $n^{th}$ source of the plurality of spatially distributed acoustic sources containing K atoms and $Z_n \in R^{K \times L}$ denotes the learnt coefficients for the $n^{th}$ source of the plurality of spatially distributed acoustic sources, $S_{bfn} \in R^{T \times L}$ represents the Mel-spectrogram for the $n^{th}$ source of the plurality of spatially distributed acoustic sources with T features of length L.

In general, it is noted that value of K>>T that results an overcomplete dictionary. Hence a sparsity constraint is imposed on $Z_n$. By enforcing the $l_1$-norm sparsity on the coefficients $Z_n$, the dictionary learning formulation is given as:

$$\min_{D_n Z_n} \| S_{bf_n} - D_n Z_n \|_F^2 + \lambda \| Z_n \|_1 \qquad (4)$$

where $\lambda$ is a real positive number that controls trade-off between the sparsity in $Z_n$ and data fidelity term $$(\| S_{bf_n} - D_n Z_n \|_F^2).$$

Data fidelity term minimizes the reconstruction error that is measured by squared difference between the $n^{th}$ source of the plurality of beamformed signal and the associated dictionary learning solution $D_n Z_n$.

The equation (4) is solved for $D_n$ and $Z_n$ using an Alternating Minimization (AM) approach as:

$$Z_n \leftarrow \min_{Z_n} \| S_{bf_n} - D_n Z_n \|_F^2 + \lambda \| Z_n \|_1 \qquad (5)$$

$$D_n \leftarrow \min_{D_n} \| S_{bf_n} - D_n Z_n \|_F^2 \qquad (6)$$

By using equation (6), an update for $D_n$ is obtained by using a least squares approach, and an update for $Z_n$ is obtained using an Iterative Soft Thresholding Algorithm (ISTA)approach. The solution for the ISTA approach is expressed as:

$$B_n = Z_n + \frac{1}{\alpha} D_n^T (S_{bf_n} - D_n Z_n) \qquad (7)$$

$$Z_n \leftarrow signum (Bn) \max \left( 0, |Bn| - \frac{\lambda}{2\alpha} \right)$$

The learnt source specific dictionary and the coefficients are updated iteratively based on the obtained updates of the $D_n$, and the $Z_n$, until the objective function given in equation (4) of the dictionary learning formulation converges for each of the plurality of spatially distributed acoustic sources. The coefficients associated with each of the spatially distributed acoustic sources are estimated by using one of techniques such as ISTA, Matching Pursuit (MP), Orthogonal Matching Pursuit (OMP) and Basis Pursuit (BP).

Once the source-specific dictionaries are learnt in the training phase, the coefficients $$\hat{Z}_n^{test}$$

are calculated for n=1, . . . , N for the plurality of beamformed source signals for estimating the plurality of separated acoustic source signals $\hat{S}_1 \ldots \hat{S}_N$ as shown in the testing phase of FIG. 4, in accordance with some embodiments of the present disclosure. For the $n^{th}$ source of the plurality of spatially distributed acoustic sources, with the beamformed source signal $W_{bfn}$ and the learnt source specific dictionary $D_n$, the sparse solution $$\hat{Z}_n^{test}$$

can be obtained by:

$$\hat{Z}_n^{test} \leftarrow \min_{\hat{Z}_n^{test}} \| W_{bf_n} - D_n \hat{Z}_n^{test} \|_F^2 + \lambda \| \hat{Z}_n^{test} \|_1 \qquad (8)$$

At step 310, the one or more hardware processors 104 estimate, by the one or more hardware processors, the plurality of separated acoustic source signals associated with the spatially distributed acoustic sources, using the learnt source specific dictionary and coefficients associated with each of the plurality of spatially distributed acoustic sources. The $n^{th}$ separated acoustic source signal of the plurality of separated acoustic source signal is estimated as:

$$\hat{S}_n = D_n \hat{Z}_n^{test} \qquad (9)$$

In the similar way, the plurality of separated acoustic source signals corresponding to the plurality of spatially distributed acoustic sources are estimated.

Upon estimating the plurality of separated acoustic source signals, at step 312 the one or more hardware processors 104 analyze the plurality of separated acoustic source signals with the corresponding normal machine sound template for each of the plurality of spatially distributed acoustic sources, using the threshold value. A deviation beyond the threshold value is indicated as the anomaly, and the threshold values corresponding to each of the plurality of spatially distributed acoustic sources are empirically calculated. Once the plurality of separated acoustic source signals are estimated, they are analyzed for the anomaly by observing the change between the plurality of separated acoustic source signals and their corresponding normal machine sound template using one of Mean-Square-Error (MSE) and Signal-to-Noise Ratio (SNR) approach.

EXPERIMENTAL RESULTS

The system 100 and method of the present disclosure is evaluated using the available MIMII dataset for robust anomaly detection. This dataset contains both the normal acoustic signals and anomalous acoustic signals captured from four different machines, namely, solenoid valves, water pumps, industrial fans, and slide rails, operating in a real factory environment. The experimental setup employs a circular microphone array of eight elements (channels), acoustic signals are sampled at 16 kHz with the different machines spatially located at 0, 90, 180, 270 degrees. The dataset contains multiple sound files (10s each) for each of the spatially distributed acoustic sources with factory noise added at different signal-to-noise ratio (SNR) levels to mimic a real factory scenario. Although the data contains seven different product models for each of the plurality of spatially distributed acoustic sources, the proposed disclosure considers one product model (Model ID: 00) for each of the spatially distributed acoustic sources type with 6 dB SNR for performance evaluation. Model ID: 00 contains a total of 4076 normal and 1025 anomalous sound files for the plurality of spatially distributed acoustic sources. In literature (e.g., "H. Wu, J. He, M. T"om"osk"ozi, and F. H. Fitzek, "Abstraction-based multiobject acoustic anomaly detection for low-complexity big data analysis," in 2021 IEEE International Conference on Communications Workshops (ICC Workshops), 2021, pp. 1-6"), multi-channel composite mixtures are synthesized by adding together (channel-wise) the normal and abnormal sounds from plurality of spatially distributed acoustic sources to mimic the real factory environment where the plurality of spatially distributed acoustic sources operates simultaneously.

The system 100 and method of the present disclosure is compared against the IA-Net method in literature (e.g., "H. Wu, J. He, M. T"om"osk"ozi, and F. H. Fitzek, "Abstraction-based multiobject acoustic anomaly detection for low-complexity big data analysis," in 2021 IEEE International Conference on Communications Workshops (ICC Workshops), 2021, pp. 1-6")) that considers a signal channel mixture. For reference, results with the MIMII baseline anomaly detection methods based on Autoencoder (AE) and its deep variant, Dense AE are also provided. It is noted that both the AE baseline techniques consider a single channel and a single source. They employ separate AEs that are trained for individual acoustic signals for the anomaly detection. Additionally, the system 100 and method of the present disclosure is compared with three state-of-the-art Source Separation (SS) methods namely, Multichannel Variational Autoencoder (MVAE), Fast Multichannel Nonnegative Matrix Factorization (FastMNMF) and Random Directions (Randdir), in accordance with some embodiments of the present disclosure. While the MVAE is completely a data-driven approach, the FastMNMF is based on traditional signal processing techniques and the Randdir considers a probabilistic optimization framework. Similar to the present disclosure, for fair comparison, these methods use DAS-BF signals as an input in the first stage followed by the same change detection in the second stage for the anomaly detection.

MVAE and FastNMF consider spectrograms extracted from each of the plurality of beamformed source signals that are stacked together and fed as input to these methods. While the Randdir works directly on the stacked plurality of beamformed source signals. In the present disclosure the plurality of Mel-spectrograms are computed using a frame size of 1024, a hop size of 512, and 64 Mel-filters for each of the plurality of beamformed source file. Four frames of the plurality of Mel-spectrograms are combined to create an input feature vector, T=256. The dictionaries are learnt for each of the plurality of beamformed signals using the normal machine sound template in the training phase. The value of A=10 and K=500 are obtained using a grid search for the plurality of spatially distributed acoustic sources. The disclosed method 300 is run for 100 iterations in the training phase. Here, 50% of normal acoustic sound files for each of the plurality of spatially distributed acoustic sources are used in the training phase. While the remaining 50% synthesized normal mixture files are used for in the testing phase. The faulty sound mixtures are synthesized using all the anomalous acoustic sound files. It is ensured that the faulty mixture contains sound of only one faulty machine at a time. The change detection module makes use of MSE for computing change between the plurality of separated acoustic source signals and the corresponding normal machine sound template to identify the change. Any change observed beyond a threshold is indicated as an anomaly. It is noticed that the thresholds are empirically calculated for each plurality of spatially distributed acoustic sources and tuned separately for each method.

TABLE I

Results for Anomaly Detection with Different Methods

| | Fan | | Pump | | Slider | | Valve | |
|---|---|---|---|---|---|---|---|---|
| Methods | Acc. | F1 | Acc. | F1 | Acc. | F1 | Acc. | F1 |
| Methods applied on single machine sound | | | | | | | | |
| MIMII (Baseline) | 0.60 | 0.46 | 0.71 | 0.51 | 0.97 | 0.93 | 0.49 | 0.26 |
| Dense AE | 0.60 | 0.47 | 0.74 | 0.53 | 0.92 | 0.82 | 0.50 | 0.33 |
| Methods applied on mixed machine sound | | | | | | | | |
| MVAE | 0.68 | 0.31 | 0.61 | 0.26 | 0.89 | 0.74 | 0.56 | 0.32 |
| FASTMNMF | 0.79 | 0.60 | 0.81 | 0.61 | 0.85 | 0.72 | 0.63 | 0.49 |
| Randdir | 0.44 | 0.28 | 0.67 | 0.40 | 0.74 | 0.52 | 0.70 | 0.42 |
| DAS-BF | 0.21 | 0.13 | 0.66 | 0.51 | 0.99 | 0.97 | 0.93 | 0.85 |
| IA-Net | 0.65 | 0.50 | 0.77 | 0.55 | 0.94 | 0.91 | 0.81 | 0.43 |
| Disclosed Approach | 0.79 | 0.60 | 0.81 | 0.63 | 0.99 | 0.98 | 0.94 | 0.87 |

TABLE I summarizes the performance of different methods for the anomaly detection in terms of accuracy and F1 score. To demonstrate the effectiveness of the disclosed method for estimating the plurality of separated acoustic source signals associated with the spatially distributed acoustic sources, in addition to other source separation methods, results with the DAS-BF alone are also presented. From the TABLE 1 it is observed that, unlike other approaches that seem to provide high accuracy compared to the F1 score for the individual acoustic sources, the present disclosure performs consistently well in both metrics. This indicates that the disclosed two-stage method is more robust and capable of detecting acoustic anomalies with less false positives. Even among different source separation techniques, the disclosed method provides the best performance, with FastMNMF being the second best. It is noticed that results with the DAS-BF technique alone are not good as the plurality of separated acoustic source signals are highly impacted by interfering sources and noise, making it challenging to identify the acoustic anomalies. More refined separation using the DL approach resulted in the better anomaly detection. The results also present the improvement in detection accuracy observed when the multi-channel acoustic mixed signal is utilized compared to a single channel acoustic mixture considered in the IA-Net. Moreover, it is also clear from that table that the disclosed two-stage approach performs even better than the single source anomaly detection baseline methods. It is noticed that, unlike in literature (e.g., "H. Purohit, R. Tanabe, K. Ichige, T. Endo, Y. Nikaido, K. Suefusa, and Y. Kawaguchi, "Mimii dataset: Sound dataset for malfunctioning industrial machine investigation and inspection," arXiv preprint arXiv: 1909.09347, 2019.") and (e.g., "A. Ribeiro, L. M. Matos, P. J. Pereira, E. C. Nunes, A. L. Ferreira, P. Cortez, and A. Pilastri, "Deep dense and convolutional autoencoders for unsupervised anomaly detection in machine condition sounds," arXiv preprint arXiv:2006.10417, 2020.") a mixture of multiple sources is present in most of the practical industrial applications. The results show the ability of the disclosed two-stage approach for estimating the plurality of separated acoustic source signals that helps in the robust anomaly detection under such challenging multi-source scenarios.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The present disclosure herein addresses estimation of the plurality of separated acoustic source signals from the multi-channel acoustic mixed signal in the industrial setting. The disclosed method presents the two-stage approach for the anomaly detection using the multi-channel acoustic mixed signal. In the first stage, separation of the plurality of acoustic signals corresponding to the spatially distributed acoustic sources is performed at the coarser level by using a well-known computationally lightweight DAS-BF. Subsequently, the dictionaries pre-trained using the plurality of acoustic signals of the individual source machines are utilized for generating the plurality of separated acoustic source signals. The generated plurality of separated acoustic source signals are analyzed for the anomaly detection by comparing them with the corresponding normal machine sound template.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method 300, the method comprising:

receiving, via a microphone array controlled by one or more hardware processors, a multi-channel acoustic mixed signal, from a plurality of spatially distributed acoustic sources, wherein the multi-channel acoustic mixed signal comprises a plurality of acoustic source signals interfered with each other, received from the plurality of spatially distributed acoustic sources;

obtaining, by the one or more hardware processors, a plurality of beamformed source signals, by feeding the multi-channel acoustic mixed signal to a Delay-and-Sum beamforming (DAS-BF);

computing, by the one or more hardware processors, a plurality of Mel-spectrograms corresponding to each of the plurality of beamformed source signals;

estimating, by the one or more hardware processors, coefficients associated with each of the plurality of spatially distributed acoustic sources, from each of the plurality of Mel-spectrograms and a source specific dictionary is learnt for each of the plurality of spatially distributed acoustic sources;

estimating, by the one or more hardware processors, a plurality of separated acoustic source signals associated with the plurality of spatially distributed acoustic sources, using the learnt source specific dictionary and the coefficients associated with each of the plurality of spatially distributed acoustic sources; and analyzing, by the one or more hardware processors, the plurality of separated acoustic source signals with a normal machine sound template corresponding to each of the plurality of spatially distributed acoustic sources, using a threshold value, wherein a deviation beyond the threshold value is indicated as an anomaly.

2. The processor implemented method of claim 1, wherein the source specific dictionary corresponding to each of the plurality of spatially distributed acoustic sources is learnt by:

receiving, via the corresponding microphone array controlled by the one or more hardware processors, a plurality of multi-channel acoustic source signals, from each of the plurality of spatially distributed acoustic sources;

estimating, by the one or more hardware processors, a plurality of beamformed signals, by feeding each of the plurality of multi-channel acoustic source signals to the DAS-BF individually;

computing, by the one or more hardware processors, the plurality of Mel-spectrograms corresponding to each of the plurality of beamformed signals;

generating, by the one or more hardware processors, a plurality of learned dictionaries for each of the plurality of Mel-spectrograms corresponding to the plurality of the beamformed source signals, by using a dictionary learning formulation, wherein the dictionary learning formulation comprises the source specific dictionary and the coefficients, for each of the plurality of spatially distributed acoustic sources;

enforcing, by the one or more hardware processors, an $l_1$-norm sparsity on the coefficients, for each of the dictionary learning formulation associated with the each of the plurality of spatially distributed acoustic sources; and obtaining, by the one or more hardware processors, the source specific dictionary and the coefficients associated with each of the plurality of spatially distributed acoustic sources, by iteratively solving the dictionary learning formulation using an Alternating Minimization (AM) approach.

3. The processor implemented method of claim 1, wherein the coefficients associated with each of the plurality of spatially distributed acoustic sources are estimated by using one of Iterative Soft Thresholding Algorithm (ISTA), Matching Pursuit (MP), Orthogonal Matching Pursuit (OMP) and Basis Pursuit (BP).

4. The processor implemented method of claim 1, wherein the threshold value is calculated empirically using one of Mean-Square-Error (MSE) and Signal-to-Noise Ratio (SNR) approach.

5. The processor implemented method of claim 2, wherein the microphone array receives multi-channel acoustic source signal individually when only the corresponding spatially distributed acoustic source of the plurality of spatially distributed acoustic sources is operational, and the remaining plurality of spatially distributed acoustic sources are not operational.

6. The processor implemented method of claim 2, wherein the learnt source specific dictionary associated with each of the plurality of spatially distributed acoustic sources is updated in each iteration using a least squares approach.

7. The processor implemented method of claim 2, wherein the dictionary and the coefficients associated with each of the plurality of spatially distributed acoustic sources are updated iteratively until an objective function of the dictionary learning formulation converges for each of the plurality of spatially distributed acoustic sources.

8. A system comprising:

a memory storing instructions;

one or more communication interfaces; and one or more hardware processors coupled to the memory via the one or more communication interfaces, wherein the one or more hardware processors are configured by the instructions to:

receive via a microphone array, a multi-channel acoustic mixed signal, from a plurality of spatially distributed acoustic sources, where in the multi-channel acoustic mixed signal comprises a plurality of acoustic source signals interfered with each other, received from the plurality of spatially distributed acoustic sources;

obtain a plurality of beamformed source signals, by feeding the multi-channel acoustic mixed signal to a Delay-and-Sum beamforming (DAS-BF);

compute a plurality of Mel-spectrograms corresponding to each of the plurality of beamformed source signals;

estimate coefficients associated with each of the plurality of spatially distributed acoustic sources, from each of the plurality of Mel-spectrograms and a source specific dictionary is learnt for each of the plurality of spatially distributed acoustic sources;

estimate a plurality of separated acoustic source signals associated with the plurality of spatially distributed acoustic sources, using the learnt source specific dictionary and the coefficients associated with each of the plurality of spatially distributed acoustic sources; and analyze the plurality of separated acoustic source signals with a normal machine sound template corresponding to each of the plurality of spatially distributed acoustic sources, using a threshold value, wherein a deviation beyond the threshold value is indicated as an anomaly.

9. The system of claim 8, wherein the one or more hardware processors are configured to learn the source specific dictionary corresponding to each of the plurality of spatially distributed acoustic sources by:

receiving, via the corresponding microphone array, a plurality of multi-channel acoustic source signals, from each of the plurality of spatially distributed acoustic sources;

estimating a plurality of beamformed signals, by feeding each of the plurality of multi-channel acoustic source signals to the DAS-BF individually;

computing the plurality of Mel-spectrograms corresponding to each of the plurality of beamformed signals;

generating a plurality of learned dictionaries for each of the plurality of Mel-spectrograms corresponding to the plurality of the beamformed source signals, by using a dictionary learning formulation, wherein the dictionary learning formulation comprises the source specific dictionary and the coefficients, for each of the plurality of spatially distributed acoustic sources;

enforcing an $l_1$-norm sparsity on the coefficients, for each of the dictionary learning formulation associated with the each of the plurality of spatially distributed acoustic sources; and obtaining the source specific dictionary and the coefficients associated with each of the plurality of spatially distributed acoustic sources, by iteratively solving the dictionary learning formulation using an Alternating Minimization (AM) approach.

10. The system of claim 8, wherein the one or more hardware processors are configured to estimate the coefficients associated with each of the plurality of spatially distributed acoustic sources by using one of Iterative Soft Thresholding Algorithm (ISTA), Matching Pursuit (MP), Orthogonal Matching Pursuit (OMP) and Basis Pursuit (BP).

11. The system of claim 8, wherein the one or more hardware processors are configured to calculate the threshold value emperically using one of Mean-Square-Error (MSE) and Signal-to-Noise Ratio (SNR) approach.

12. The system of claim 9, wherein the microphone array receives multi-channel acoustic source signal individually when only the corresponding spatially distributed acoustic source of the plurality of spatially distributed acoustic sources is operational, and the remaining plurality of spatially distributed acoustic sources are not operational.

13. The system of claim 9, wherein the learnt source specific dictionary associated with each of the plurality of spatially distributed acoustic sources is updated in each iteration using a least squares approach.

14. The system of claim 9, wherein the dictionary and the coefficients associated with each of the plurality of spatially distributed acoustic sources are updated iteratively until an objective function of the dictionary learning formulation converges for each of the plurality of spatially distributed acoustic sources.

15. One or more non-transitory machine-readable information storage mediums comprising one or more instructions which when executed by one or more hardware processors cause:

receiving, via a microphone array, a multi-channel acoustic mixed signal, from a plurality of spatially distributed acoustic sources, wherein the multi-channel acoustic mixed signal comprises a plurality of acoustic source signals interfered with each other, received from the plurality of spatially distributed acoustic sources;

obtaining a plurality of beamformed source signals, by feeding the multi-channel acoustic mixed signal to a Delay-and-Sum beamforming (DAS-BF);

computing a plurality of Mel-spectrograms corresponding to each of the plurality of beamformed source signals;

estimating coefficients associated with each of the plurality of spatially distributed acoustic sources, from each of the plurality of Mel-spectrograms and a source specific dictionary is learnt for each of the plurality of spatially distributed acoustic sources;

estimating a plurality of separated acoustic source signals associated with the plurality of spatially distributed acoustic sources, using the learnt source specific dictionary and the coefficients associated with each of the plurality of spatially distributed acoustic sources; and analyzing the plurality of separated acoustic source signals with a normal machine sound template corresponding to each of the plurality of spatially distributed acoustic sources, using a threshold value, wherein a deviation beyond the threshold value is indicated as an anomaly.

16. The one or more non-transitory machine-readable information storage mediums of claim 15, wherein the source specific dictionary corresponding to each of the plurality of spatially distributed acoustic sources is learnt by:

receiving, via the corresponding microphone array controlled by the one or more hardware processors, a plurality of multi-channel acoustic source signals, from each of the plurality of spatially distributed acoustic sources;

estimating, by the one or more hardware processors, a plurality of beamformed signals, by feeding each of the plurality of multi-channel acoustic source signals to the DAS-BF individually;

computing, by the one or more hardware processors, the plurality of Mel-spectrograms corresponding to each of the plurality of beamformed signals;

generating, by the one or more hardware processors, a plurality of learned dictionaries for each of the plurality of Mel-spectrograms corresponding to the plurality of the beamformed source signals, by using a dictionary learning formulation, wherein the dictionary learning formulation comprises the source specific dictionary and the coefficients, for each of the plurality of spatially distributed acoustic sources;

enforcing, by the one or more hardware processors, an $l_1$-norm sparsity on the coefficients, for each of the dictionary learning formulation associated with the each of the plurality of spatially distributed acoustic sources; and obtaining, by the one or more hardware processors, the source specific dictionary and the coefficients associated with each of the plurality of spatially distributed acoustic sources, by iteratively solving the dictionary learning formulation using an Alternating Minimization (AM) approach.

17. The one or more non-transitory machine-readable information storage mediums of claim 15, wherein the coefficients associated with each of the plurality of spatially distributed acoustic sources are estimated by using one of Iterative Soft Thresholding Algorithm (ISTA), Matching Pursuit (MP), Orthogonal Matching Pursuit (OMP) and Basis Pursuit (BP).

18. The one or more non-transitory machine-readable information storage mediums of claim 15, wherein the threshold value is calculated empirically using one of Mean-Square-Error (MSE) and Signal-to-Noise Ratio (SNR) approach.

19. The one or more non-transitory machine-readable information storage mediums of claim 16, wherein the microphone array receives multi-channel acoustic source signal individually when only the corresponding spatially distributed acoustic source of the plurality of spatially distributed acoustic sources is operational, and the remaining plurality of spatially distributed acoustic sources are not operational.

20. The one or more non-transitory machine-readable information storage mediums of claim 16, wherein the learnt source specific dictionary associated with each of the plurality of spatially distributed acoustic sources is updated in each iteration using a least squares approach, and wherein the dictionary and the coefficients associated with each of the plurality of spatially distributed acoustic sources are updated iteratively 10 until an objective function of the dictionary learning formulation converges for each of the plurality of spatially distributed acoustic sources.

* * * * *